Oct. 14, 1952
G. C. SWENSON
2,613,558
CHATTERLESS COUNTERSINK
Filed Oct. 14, 1947
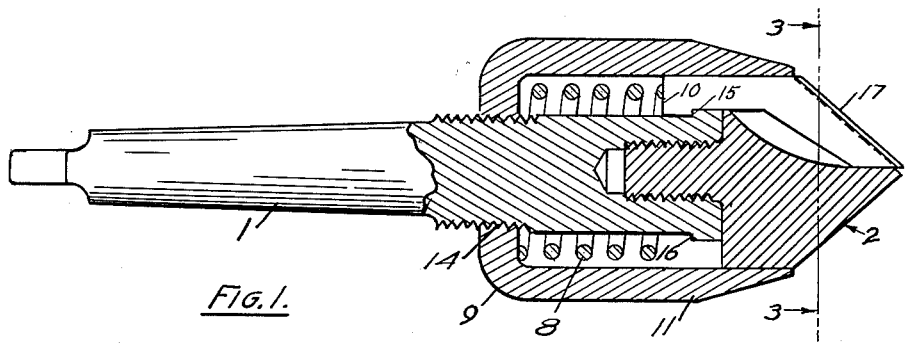
Fig. 1.
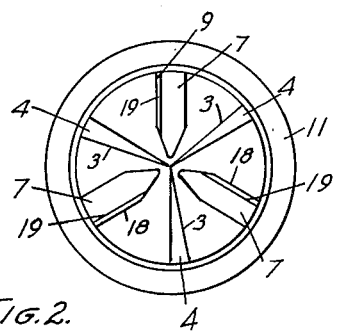
Inventor
Gordon C. Swenson
By Ralph Hammar
Attorney Patented Oct. 14, 1952

2,613,558

UNITED STATES PATENT OFFICE 2,613,558

CHATTERLESS COUNTERSINK

Gordon C. Swenson, Erie, Pa.

Application October 14, 1947, Serial No. 779,725

1 Claim. (Cl. 77—73.5)

This invention is intended to eliminate chatter in countersinks through the use of a spring loaded pressure member sharing the thrust against the work with the cutting edge.

Not only are chatter marks eliminated, but holes having chatter marks can be cleaned. Further objects and advantages appear in the specification and claim.

In the drawing Fig. 1 is a sectional elevation of a countersink embodying my invention; Fig. 2 is an end view; Fig. 3 is a section on line 3—3 of Fig. 1; Fig. 4 is a side view of one of the pressure members; Fig. 5 is an end view of the pressure member; and Fig. 6 is a perspective of the countersink with the pressure members removed.

Referring to the drawing, 1 indicates a shank carrying a countersink 2 having cutting edges 3 with relief surfaces 4 and chip clearances 5. These parts are, or may be, of common construction.

Between the cutting edges are axially extending slots 6 slidably receiving pressure members 7. The pressure members are urged outward in the slots by a coil spring 8 arranged between the bottom of a cup-shaped member 9 and the inner ends 10 of the pressure members. The cup-shaped member 9 has a sleeve-like extension 11 surrounding a cylindrical surface 12 on the countersink and serving as a guide for surfaces 13 on the pressure members 7. A threaded connection 14 between the bottom of the cup-shaped member 9 and the shank permits adjustment of the spring pressure exerted on the pressure members 7. Outward movement of the pressure members is limited by shoulders 15 which cooperate with a collar 16 on the shank. In the outermost position of the pressure members illustrated in Fig. 1 arcuate bearing surfaces 17 on the pressure members project beyond the cutting edges 3. The bearing surfaces 17 are concentric with the shank and have a contour conforming with that of the cutting edges. In the leading edge 18 of the bearing surfaces are cutting edges 19. These cutting edges are ground radially without any relief or clearance. These cutting edges serve primarily as trimmers and do not have any substantial cutting function.

In the use of the countersink the pressure transmitted from the shank to the work is divided or shared between the cutting edges 3 and the bearing surfaces 17. The bearing surfaces 17 contact the work first and align the hole to be countersunk with the shank. Thereafter the bearing surfaces exert a pressure on the countersunk hole determined by the pressure of the spring 8 and the major part of the pressure is carried on the cutting edges 3. The spring loading of the bearing surfaces provides a force acting on the shank which takes up the lost motion inevitably present in the driving spindle for the shank. It is believed that this contributes materially to the prevention of chattering of the countersink.

In addition to preventing chattering, the cutting edges 19 on the pressure members 7 have a trimming function, removing ragged pieces of metal, or highspots, in the countersunk hole. This aids the countersinking of holes having irregular edges or chatter marks. In the conventional countersink the presence of irregular edges or chatter marks increases the chattering tendency. Because chattering is eliminated no particular skill is necessary in advancing the countersink against the works. The countersink will even operate satisfactorily after the cutting edges 3 have become nicked.

What I claim as new is:

A rotatable countersink having work engaging cutting edges shaped to produce the desired countersink contour, axial slots between the cutting edges, pressure members in the slots having work engaging bearing surfaces conforming to the contour of the cutting edges, a sleeve holding the pressure members in the slots, and a spring within the sleeve urging the pressure members axially beyond the cutting edges.

GORDON C. SWENSON.

REFERENCES CITED

The following references are of record in the file of this patent:

UNITED STATES PATENTS

| Number | Name | Date |
|---|---|---|
| 1,279,302 | Dunlap | Sept. 17, 1918 |
| 1,414,565 | Gallagher | May 2, 1922 |
| 1,520,382 | Workman | Dec. 23, 1924 |
| 1,561,463 | De Rochemont | Nov. 17, 1925 |
| 2,187,221 | Brown | Jan. 6, 1940 |
| 2,196,827 | Healey | Apr. 9, 1940 |
| 2,273,258 | Groene | Feb. 17, 1942 |